(12) United States Patent
Kim et al.

(10) Patent No.: US 9,750,070 B2
(45) Date of Patent: Aug. 29, 2017

(54) METHOD AND APPARATUS FOR CONNECTING TO PACKET DATA NETWORKS IN WIRELESS COMMUNICATION SYSTEM

(71) Applicant: Samsung Electronics Co., Ltd, Gyeonggi-do (KR)

(72) Inventors: Jin-Yup Kim, Gyeonggi-do (KR); Geon-Soo Kim, Gyeonggi-do (KR); Jin-Hong Jeong, Gyeonggi-do (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 56 days.

(21) Appl. No.: 14/747,762

(22) Filed: Jun. 23, 2015

(65) Prior Publication Data
US 2016/0007402 A1 Jan. 7, 2016

(30) Foreign Application Priority Data
Jul. 3, 2014 (KR) .................. 10-2014-0083170

(51) Int. Cl.
| | | |
|---|---|---|
| *H04W 76/02* | (2009.01) | |
| *H04W 72/04* | (2009.01) | |
| *H04L 5/00* | (2006.01) | |
| *H04W 72/08* | (2009.01) | |
| *H04W 8/18* | (2009.01) | |

(52) U.S. Cl.
CPC ............ *H04W 76/025* (2013.01); *H04L 5/00* (2013.01); *H04W 72/0406* (2013.01); *H04W 8/18* (2013.01); *H04W 72/048* (2013.01); *H04W 72/08* (2013.01)

(58) Field of Classification Search
CPC ... H04W 8/18; H04W 72/04; H04W 72/0406; H04W 72/048; H04W 72/08; H04W 76/02; H04W 76/025; H04W 84/042; H04W 84/12; H04L 5/00
See application file for complete search history.

(56) References Cited

U.S. PATENT DOCUMENTS 9,350,566 B2 * 5/2016 Hurtta ................. H04L 12/5695
2007/0204050 A1 * 8/2007 Liu ..................... H04L 12/5695
709/230

(Continued)

FOREIGN PATENT DOCUMENTS

EP          2 104 275 A1   9/2009
WO    WO 2013104413 A1   7/2013

OTHER PUBLICATIONS

Extended European Search Report dated Nov. 17, 2015 in connection with European Patent Application No. 15175127.8; 8 pages.

(Continued)

*Primary Examiner* — Tri H Phan

(57) ABSTRACT

Various embodiments of the present disclosure relate to a method and apparatus for connecting to multiple Packet Data Networks (PDNs) in a wireless communication system using a Carrier Aggregation (CA) technique. In the wireless communication system using the CA technique for aggregating multiple carriers into one carrier, the wireless communication system may ensure Quality of Service (QoS) of a subscriber by mapping multiple carriers and multiple PDNs on the basis of a dynamic CA carrier. Various embodiments are possible.

17 Claims, 15 Drawing Sheets

(56) References Cited

U.S. PATENT DOCUMENTS

| | | | |
|---|---|---|---|
| 2008/0013553 A1 | 1/2008 | Shaheen | |
| 2009/0238207 A1 | 9/2009 | Zhao et al. | |
| 2011/0235595 A1* | 9/2011 | Mehta | H04W 8/082 370/329 |
| 2012/0140743 A1 | 6/2012 | Pelletier et al. | |
| 2014/0342740 A1* | 11/2014 | Kim | H04W 36/14 455/437 |
| 2015/0016367 A1 | 1/2015 | Koskinen et al. | |
| 2015/0264666 A1* | 9/2015 | Yi | H04L 5/001 370/329 |
| 2016/0021605 A1* | 1/2016 | Kim | H04W 48/18 370/328 |
| 2016/0072823 A1* | 3/2016 | Faccin | H04L 63/102 726/1 |
| 2016/0127964 A1* | 5/2016 | Roeland | H04W 36/14 370/332 |
| 2016/0315751 A1* | 10/2016 | Chandwani | H04W 16/14 |

OTHER PUBLICATIONS

Sundaresan, et al.; "Energy Efficient Carrier Aggregation Algorithms for Next Generation Cellular Networks"; IEE Int'l Conf. on ICNP; Oct. 7-10, 2013; Goettingen, Germany; 10 pages.

\* cited by examiner

Intra-band aggregation
contiguous carriers

Intra-band aggregation
non-contiguous carriers

Inter-band aggregation

Frequency A       Frequency B

Terminal A
No aggregation

Terminal B
No aggregation

Terminal C
Symmetric aggregation

Terminal D
Asymmetric aggregation

Downlink                Uplink

METHOD AND APPARATUS FOR CONNECTING TO PACKET DATA NETWORKS IN WIRELESS COMMUNICATION SYSTEM

CROSS-REFERENCE TO RELATED APPLICATION(S) AND CLAIM OF PRIORITY

The present application is related to and claims the benefit of priority under 35 U.S.C. §119(a) of Korean Patent Application No. 10-2014-0083170, filed on Jul. 3, 2014, which is hereby incorporated by reference for all purposes as if fully set forth herein.

TECHNICAL FIELD

Various embodiments of the present disclosure relate to a method and apparatus for connecting to a Packet Data Network (PDN) in a wireless communication system.

BACKGROUND

According to a purpose of packet data to be transmitted/received by a terminal (e.g., an electronic device such as a smartphone), a wireless communication system may transmit a packet by establishing a Packet Data Network (PDN) connection corresponding thereto and by creating a bearer in the PDN connection. For example, in order to utilize an Internet protocol Multimedia Subsystem (IMS) service, a connection to a packet data network in which IMS-related servers are present is established. In addition, in order to use an Internet service, a connection to a packet data network constituting an Internet network is established.

In addition to the IMS service and the Internet service, various packet data networks may be present for a Voice of Long Term Evolution (VoLTE) service or the like. The terminal may be connected to the various packet data networks to use various services.

Recently, a standardization task for the post LTE technology is underway in a 3rd Generation Partnership Project (3GPP) standardization organization. In the present specification, the aforementioned technique is referred to as "LTE Advanced" or "LTE-A". One of the primary differences between an LTE system and an LTE-A system is a difference of a system bandwidth. The LTE-A system aims to support a broadband equal to or greater than up to 100 MHz. For this, a carrier aggregation or bandwidth aggregation technique is used in which multiple frequency bands constitute one broadband. That is, the carrier aggregation technique is a technique in which the multiple frequency bands are used as one logical frequency band to use a broader frequency band. Each frequency bandwidth may be defined on the basis of a system bandwidth used in the LTE system.

SUMMARY

According to various embodiments of the present disclosure, a method of an electronic device for connecting to multiple PDNs in a wireless communication system using a CA technique may include transmitting information regarding a CA carrier and information regarding a first operation policy of multiple PDNs based on the CA carrier to a core network, receiving information regarding a second operation policy of multiple PDNs based on the CA carrier from the core network, and configuring a radio bearer for data communication according to the received operation policy of the second multiple PDNs based on the CA carrier.

According to various embodiments of the present disclosure, a method of a core network for connecting to multiple PDNs in a wireless communication system using a CA technique may include receiving information regarding a CA carrier and information regarding a first operation policy of multiple PDNs based on the CA carrier from an electronic device, determining whether to accept the first operation policy of multiple PDNs based on the CA carrier, transmitting information regarding a second operation policy of multiple PDNs based on the CA carrier to the electronic device according to a result of the determination, and configuring a radio bearer for data communication according to the received operation policy of the second multiple PDNs based on the CA carrier.

According to various embodiments of the present disclosure, an electronic device for connecting to multiple PDNs in a wireless communication system using a CA technique may include a transmitter for transmitting, to a core network, information regarding a CA carrier and information regarding a first operation policy of multiple PDNs based on the CA carrier; a receiver for receiving, from the core network, information regarding a second operation policy of multiple PDNs based on the CA carrier; and a processor for configuring a radio bearer for data communication according to the received operation policy of the second multiple PDNs based on the CA carrier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
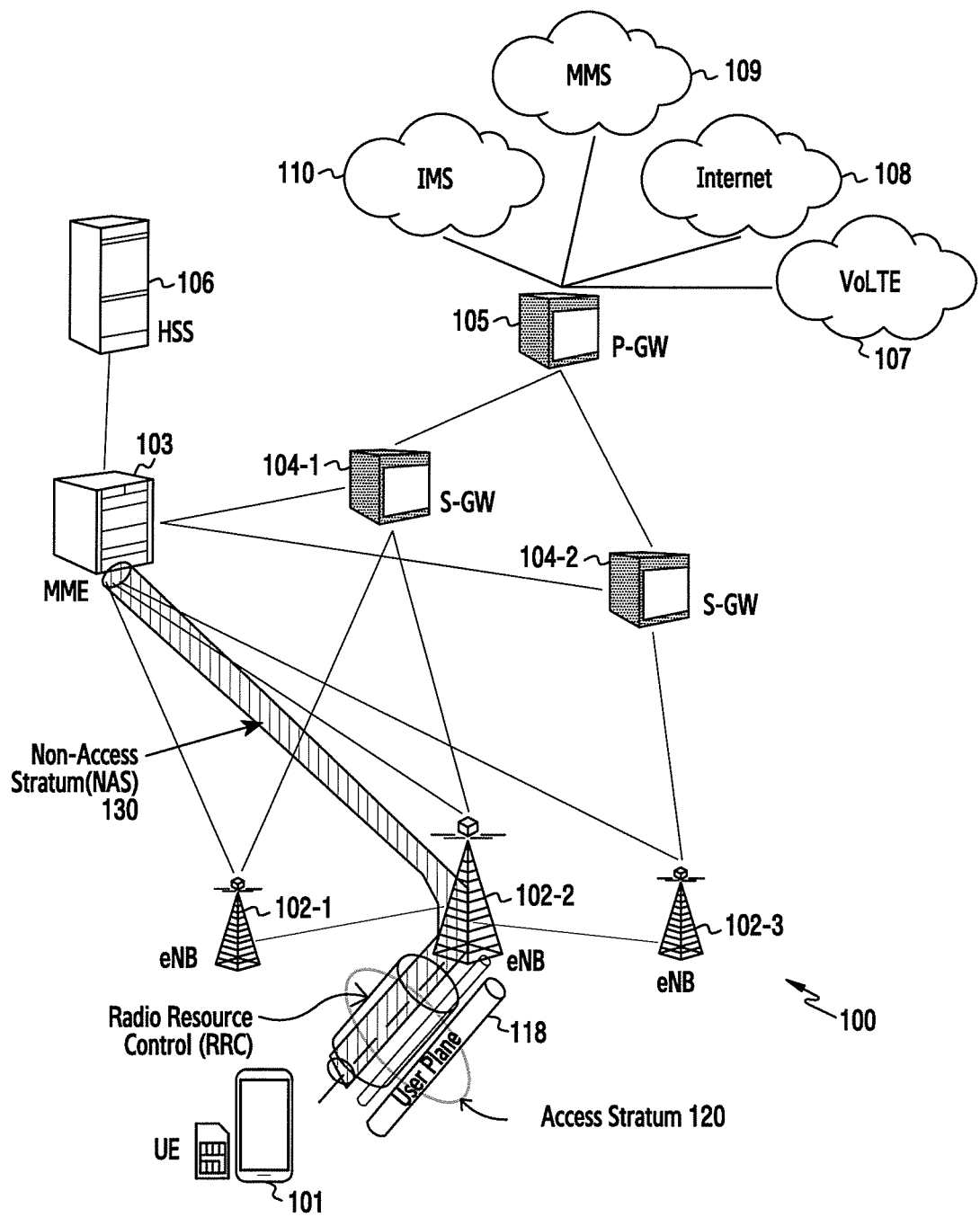
FIG. 1 illustrates a structure of a Long Term Evolution (LTE) mobile communication system according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Hereinafter, various embodiments of the present disclosure describe a method and apparatus for connecting to multiple Packet Data Networks (PDNs) in a wireless communication system using a Carrier Aggregation (CA) technique.

Hereinafter, a Long Term Evolution (LTE) mobile communication system using a CA technique is explained for example in various embodiments of the present disclosure.

There is a need for a method and apparatus for ensuring Quality of Service (QoS) when a terminal is connected to multiple PDNs in a wireless communication system using a CA technique.

Various embodiments of the present disclosure may provide a method and apparatus for connecting to multiple Packet Data Networks (PDNs) in a wireless communication system using a Carrier Aggregation (CA) technique.

Various embodiments of the present disclosure may provide a method and apparatus for ensuring QoS when a terminal is connected to multiple PDNs in a wireless communication system using a CA technique.

FIG. 1 illustrates a structure of an LTE mobile communication system according to various embodiments of the present disclosure.

Referring to FIG. 1, a radio access network of an LTE mobile communication system includes an evolved Node B (hereinafter, eNB or Node B) 102-1, 102-2, and 102-3 (generally referred to by reference number 102), a Mobility Management Entity (MME) 103, a Serving-GateWay (S-GW) 104-1 and 104-2 (generally referred to by reference number 104), a Packet Data Network GateWay (P-GW) 105, and a Home Subscriber Server (HSS) 106. A User Equipment (UE) 101 may access an external network (e.g., an Internet Protocol Multimedia Subsystem (IMS) 110, a Multi-media Message Service (MMS) 109, the Internet 108, and a Voice over LTE (VoLTE) 107) via the eNB 102, the S-GW 104, and the P-GW 105.

As a Radio Access Network (RAN) node, the eNB 102 may provide a radio connection between the UE 101 and an LTE network. In addition, the eNB 102 may provide a Radio Resource Management (RRM) function such as a radio bearer control, a wireless admission control, a dynamic radio allocation, load balancing, and an Inter-Cell Interference coordination (ICIC).

The MME 103 is a device which serves for a variety of control functions. One MME may be connected to multiple eNBs 102.

In addition, as an E-UTRAN control plane entity, the MME 103 may communicate with the HSS 106 to authenticate a user and to download a user profile, and may provide the UE 101 with an Evolved Packet System (EPS) Mobility Management (EMM) and EPS Session Management (ESM) function through Non Access Stratum (NAS) signaling 130.

As a database for storing the user profile, the HSS 106 may provide the MME 103 with user authentication information and the user profile.

The S-GW 104 is a device for providing a data bearer, and may create or remove the data bearer under the control of the MME 103. In addition, as an end point of an E-UTRAN and an Evolved Packet Core (EPC), the S-GW 104 may be a Mobility Anchor Point (MAP) when a handover is performed between the eNBs 102 and when a handover is performed between 3GPP systems.

The P-GW 105 may connect the UE 101 to external PDN networks 110, 109, 108, and 107, and may provide packet filtering. In addition, the P-GW 105 may allocate an IP address to the UE 101, and may operate as a Mobility Anchor Point (MAP) when a handover is performed between a 3GPP system and a non-3GPP system. A Policy Charging Rules Function (PCRF) (not shown) may be implemented in the P-GW 105.

In various embodiments, the PCRF is a device for controlling a policy related to Quality of Service (QoS) of a user, and a Policy and Charging Control (PCC) rule corresponding to the policy may be applied by being delivered to the P-GW 105. In addition, the PCRF may be an entity for collectively controlling accounting and QoS for traffic. According to various embodiments of the present disclosure, the PCRF may store a policy for connecting to multiple PDNs and various frequency bands based on the CA.

Meanwhile, a User Plane (UP) 118 refers to a path which connects from the UE 101 to the eNB 102, from the eNB 102 to the S-GW 104, and from the S-GW 104 to the P-GW 105 and through which user data is transmitted/received. However, among these paths, the path between the UE 101 and the eNB 102 may use a radio channel for which a resource is severely restricted. An Access Stratum (AS) 120 may be a connection for data transmission through a radio section.

QoS may be applied in an EPS bearer unit in a wireless communication system such as LTE. One EPS bearer may be used to transmit IP flows having the same QoS requirement. A parameter related to the QoS may be designated in the EPS bearer. The parameter may include a QoS Class Identifier (QCI) and an Allocation and Retention Priority (ARP). The QCI is a parameter which defines a QoS priority as an integer value. The ARP may be a parameter which determines whether to accept or deny a creation of a new EPS bearer.

One EPS bearer belongs to a PDN connection, and the PDN connection may have an attribute of an Access Point Name (APN). If a PDN connection for a service of the VoLTE 107 or the IMS 110 is established, the PDN connection may be established by using an APN.

Figure 2:
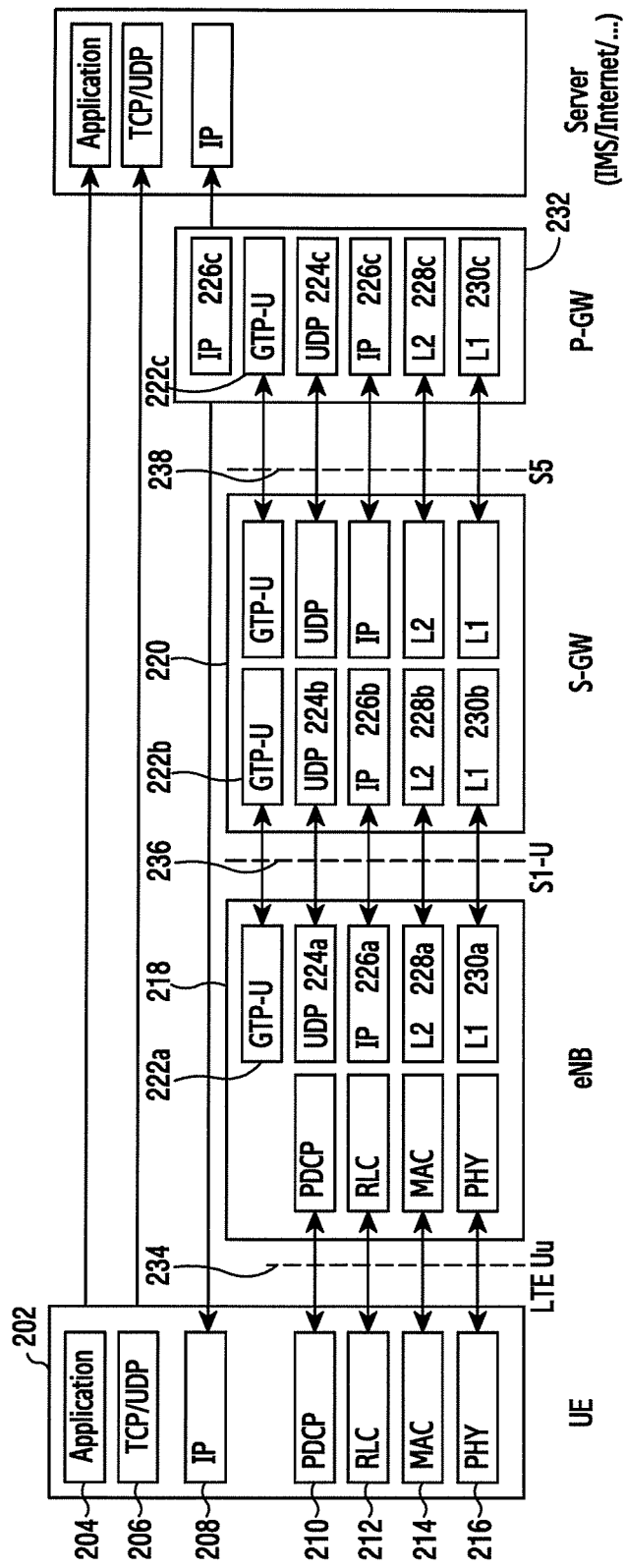
FIG. 2 illustrates a radio protocol architecture for a user plane according to various embodiments of the present disclosure.

FIG. 2 illustrates a radio protocol architecture for a user plane according to various embodiments of the present disclosure. The user plane is a protocol stack for user data transmission.

Referring to FIG. 2, a protocol stack 202 of a UE may include an application layer 204, a TCP/UDP layer 206, an IP layer 208, a Packet Data Convergence Protocol (PDCP) layer 210, a Radio Link Control (RLC) layer 212, an MAC layer 214, and a PHY layer 216. A protocol stack 218 of an eNB and a protocol stack 220 of an S-GW may include a GPRS Tunneling Protocol User Plane (GTP-U) layer 222a-222b, a UDP layer 224a-224b, an IP layer 226a-226b, an L2 layer 228a-228b, and an L1 layer 230a-230b. A protocol stack 232 of a P-GW may include an IP layer 226c, a GTP-U layer 222c, a UDP layer 224c, an IP layer 226c, an L2 layer 228c, and an L1 layer 230c.

In the 3GPP specification, LTE-Uu 234 is defined as a radio interface between the UE and the eNB, and S1-U 236 is defined as an interface between the eNB and the S-GW. The S1-U 236 may provide GTP tunneling per bearer. Further, S5 238 is defined as an interface between the S-GW and the P-GW. The GTP tunneling may be used to transmit a user IP packet on the interfaces S1-U 236 and S5 238.

The PHY layer may provide an information transfer service to a higher layer through a physical channel. The PHY layer is connected to a higher layer, i.e., a Medium Access Control (MAC) layer, through a transport channel. Data may be transferred between the MAC layer and the PHY layer through the transport channel. The transport channel may be classified according to how and with what characteristics the data is transmitted through a radio interface.

The data may be transferred between different PHY layers, i.e., a PHY layer of a transmitter and a PHY layer of a receiver, through the physical channel. For example, the physical channel may be modulated in an Orthogonal Frequency Division Multiplexing (OFDM) manner, and may utilize time and frequency as a radio resource.

A function of the MAC layer may include mapping between a logical channel and the transport channel and multiplexing/de-multiplexing to a transport block provided to the physical channel through the transport channel of an MAC Service Data Unit (SDU) belonging to the logical channel. The MAC layer may provide a service to an RLC layer through the logical channel. Further, the MAC layer may dynamically allocate radio resources to UEs, and may perform a QoS control function to ensure QoS negotiated for each radio bearer.

A function of the RLC layer may include concatenation of an RLC SDU, segmentation for transmitting a packet received in a PDCP layer through a radio link, and reassembly for transmitting a packet received through the radio link to the PDCP layer. To ensure a variety of QoS required by a Radio Bearer (RB), the RLC layer may provide three operation modes, i.e., a Transparent Mode (TM), an Unacknowledged Mode (UM), and an Acknowledged Mode (AM). An AM RLC may provide error correction by using an Automatic Repeat reQuest (ARQ).

A function of a Packet Data Convergence Protocol (PDCP) layer in the user plane may include user data delivery, header compression, and ciphering. A function of a PDCP layer in a control plane may include control-plane data delivery and ciphering/integrity protection.

A function of the IP layer may include forwarding in which a router transfers a packet to a proper output link when the packet arrives to an input link and routing in which a packet path is determined when a transceiver transmits the packet.

A function of the TCP/UDP layer may use two protocols, i.e., TCP and UDP, as a layer which serves to control an operation for examining an error of a packet delivered by the IP layer, for requesting retransmission, or the like.

A function of the application layer may use a protocol implemented in a service and an application program, and may provide an interface connection to a network while providing a message creation method to a user, and may provide a rule and format for controlling processed data.

Figure 3:
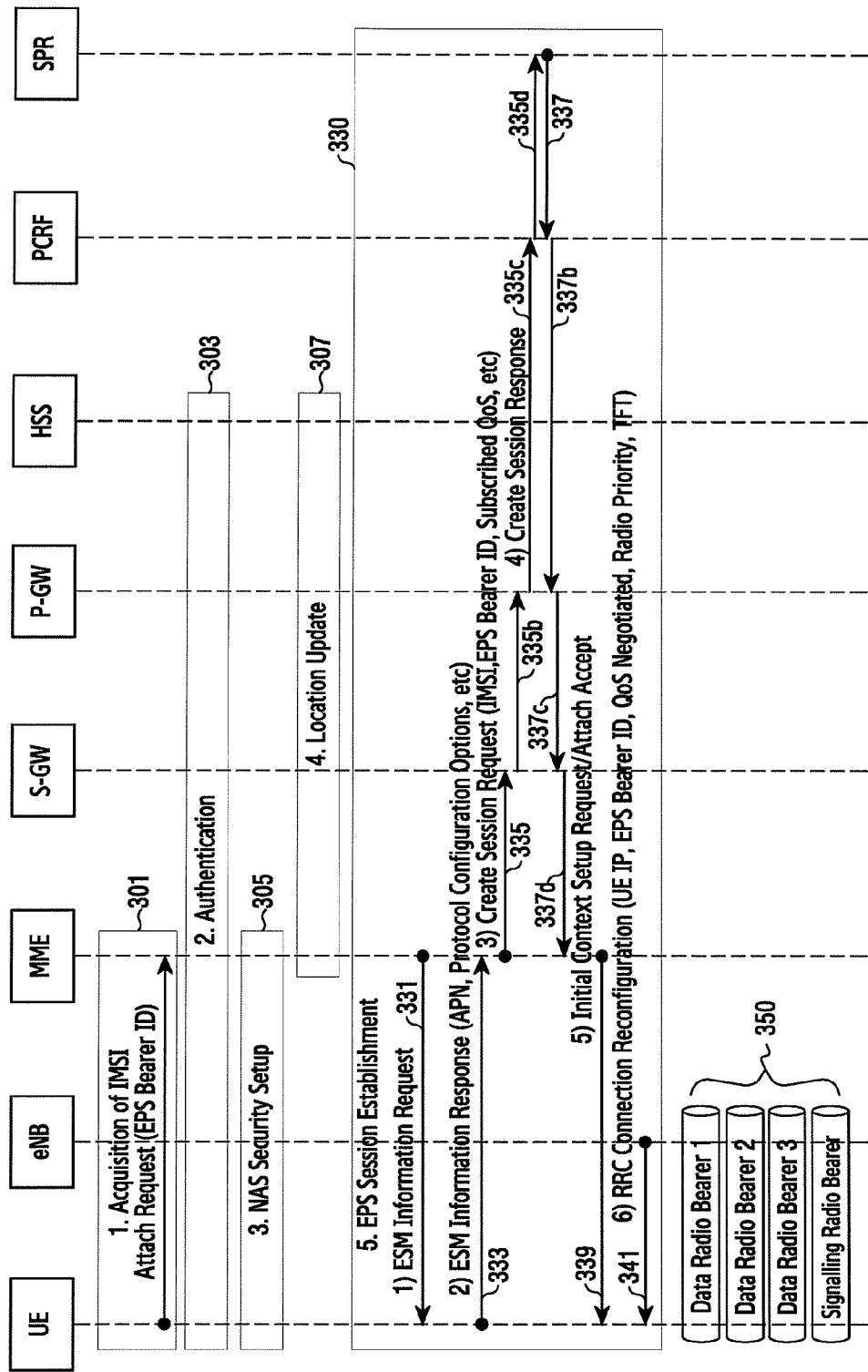
FIG. 3 illustrates a process for an initial attach in an LTE system using a Carrier Aggregation (CA) technique according to various embodiments of the present disclosure.

FIG. 3 illustrates a process 300 for an initial attach in an LTE system using a CA technique according to various embodiments of the present disclosure.

Referring to FIG. 3, according to various embodiments, an LTE initial attach process 300 may include an operation 301 for acquiring an International Mobile Subscriber Identity (IMSI) of a UE, an authentication operation 303, an NAS security setup operation 305, a location update operation 307, or an EPS session establishment operation 330.

In the NAS security setup operation 305, upon the completion of a mutual authentication, an encryption & integrity protected operation is prepared to protect a message transmitted/received between the UE and an MME in a radio section, and upon the completion of this operation, an NAS message (i.e., a message between the UE and the MME) can be protected in the radio section.

In the location update operation 307, the MME (to which the UE has access) is registered to the HSS, and the HSS may deliver a service profile (or QoS profile) of the UE to the MME.

In the EPS session establishment operation 330, the UE may allocate an IP address, and may create an EPS bearer (i.e., a DRB tunnel between the UE and an eNB, an S1 GTP tunnel between the eNB and an S-GW, or an S5 GTP tunnel between the S-GW and a P-GW) to be used by the UE. When the EPS bearer is created, a QoS parameter of the EPS bearer may be determined on the basis of a QoS profile determined by a PCRF.

More specifically, in the LTE initial attach process 300, the UE may deliver its IMSI to the MME through an attach request message. If the UE has previously accessed the LTE system, a Globally Unique Temporary Identifier (GUTI) is allocated to the UE from an LTE network, and the UE may send a GUTI (but not the IMSI) to the MME in a reattach process at a later time. In addition, the eNB may deliver a cell ID (or E-UTRAN Cell Global Identifier (EDGI)) of a cell to which the UE has an access or Tracking Area Identifier (TAI) information to the MME.

According to various embodiments, in the authentication operation 303, the MME may request the HHS to send an Authentication Vector (AV) to authenticate the UE. The HSS may create the AV for the UE and may deliver it to the MME. A part of AV information received from the HSS may be delivered to the UE. Thereafter, the authentication may be complete by comparing respective authentication values created by the UE and the MME.

After the authentication operation 303, the security setup operation 305 may be performed to reliably deliver an NAS message (i.e., a message between the UE and the MME) in the radio section.

After the NAS security setup operation 305, the MME may report to the HSS a specific IMSI value of the UE having an access to the MME, and the HHS may store a result thereof, thereby performing the location update operation 307 for the UE. Further, the HHS may deliver to the MME a service profile (or a QoS profile) for a subscriber. The subscriber service profile may be provisioned to the HSS by using a subscriber fee, an additional service subscription, or the like in a subscriber registration process.

In the EPS session setup operation 330, the MME may transmit an ESM information request to the UE to search for ESM information of the UE (operation 331). The ESM information may imply an APN, a protocol configuration option, and an EPS bearer identity.

The UE may transmit to the MME an ESM information response including ESM information (e.g., APN, EPS bearer identity, or protocol configuration option). In addition, according to various embodiments of the present disclosure, the ESM information may further include band information (e.g., band usage information based on the CA technique, bands x, y, z or a band x+y+z or bands x+y, z) based on an operation policy in the protocol configuration option.

In order to start to create the EPS session (or EPS bearer) by using the service profile received from the HSS, the MME may transmit to the S-GW a create session request message including a subscriber's QoS profile, an IMSI, or an EPS bearer ID (operation 335). The S-GW may deliver the same message to the P-GW (operation 335b). The P-GW may allocate an IP address to be used by the UE by interworking with a DHCP server.

Further, the P-GW may deliver a QoS profile of a subscriber to the PCRF so that the UE requests the QoS profile to be finally used by the subscriber (operation 335c). The PCRF may request a Subscription Profile Repository (SPR) to send an access profile for the subscriber (operation 335d), and the SPR may deliver a value thereof to the PCRF (operation 337).

In operation 337b, the PCRF performs a policy decision by using the QoS profile received from the P-GW and the access profile received from the SPR, and delivers to the P-GW the final QoS profile to be used by the UE and PDN connection information corresponding to a band based on the CA. In this case, information regarding accounting may also be delivered together. That is, the PCRF may be an entity for determining an operation policy (e.g., QoS information) and an accounting scheme for each UE.

According to various embodiments, the P-GW may create an EPS bearer (or GTP tunnel) on the basis of QoS information received from the PCRF, and may perform accounting according to the accounting scheme when the UE uses the Internet at a later time. When transmitting a create session response to the S-GW, the P-GW may deliver PDN connection information corresponding to the band based on the CA and the final QoS profile transmitted by the PCRF (operation 337c).

The S-GW may also create the EPS bearer (or GTP tunnel) on the basis of the QoS information received from the P-GW, and may deliver to the MME the create session response message (operation 337d).

The MME may deliver to the UE an attach accept by including an IP address to be used by the UE and QoS information to be chosen by the UE (operation 339).

The eNB may perform an AS security setup process for protecting a control signal and user data of the radio section between the UE and the eNB, and also may create a DRB tunnel between the UE and the eNB. The MME may deliver PDN connection information, a UE IP, an EPS bearer ID, a negotiated QoS parameter, a radio priority, and Traffic Flow Templates (TFT) corresponding to the band based on the CA to the UE through an RRC connection reconfiguration message (operation 341).

Upon completion of the LTE initial attach process 300, creating of the EPS bearer is complete, and the UE may use the PDN via the eNB, the S-GW, and the P-GW (operation 350).

Figure 4:
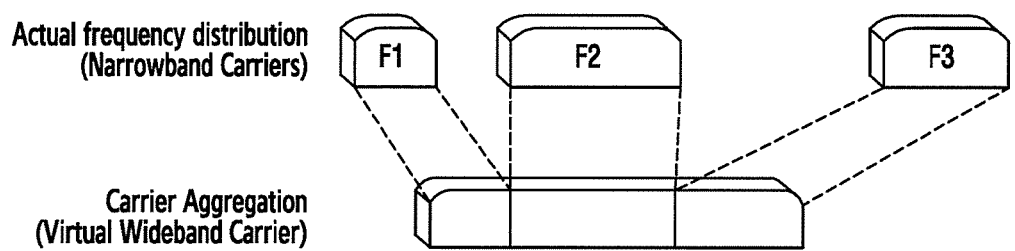
FIG. 4 illustrates a CA according to various embodiments of the present disclosure.

FIG. 4 illustrates a CA concept according to various embodiments of the present disclosure.

Referring to FIG. 4, according to various embodiments, a CA technique is a technique for combining narrowband carriers F1, F2, and F3 into one virtual broadband carrier. Herein, a bandwidth corresponding to F1, a bandwidth corresponding to F2, and a bandwidth corresponding to F3 may be contiguous or non-contiguous. Further, the bandwidth corresponding to F1, the bandwidth corresponding to F2, and the bandwidth corresponding to F3 may have the same size or may have different sizes.

Figure 5A:
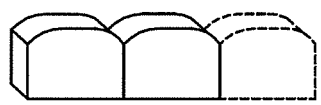
FIG. 5A to FIG. 5C illustrate example types of CA according to various embodiments of the present disclosure.
Figure 5A:
Figure 5B:
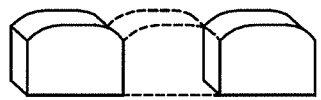
Figure 5B:
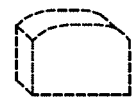
Figure 5C:
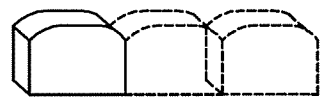
Figure 5C:
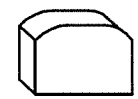

FIG. 5A to FIG. 5C illustrate types of CA according to various embodiments of the present disclosure.

FIG. 5A illustrates an intra-band contiguous carrier aggregation for connecting contiguous carriers in the same band.

FIG. 5B illustrates an intra-band non-contiguous carrier aggregation for connecting non-contiguous carriers in the same band.

FIG. 5C illustrates an inter-band non-contiguous carrier aggregation for connecting carriers in different bands (Frequency A and Frequency B).

FIG. 6A to FIG. 6D illustrate a terminal type based on a CA technique according to various embodiments of the present disclosure.

Figure 6A:
FIG. 6A to FIG. 6D illustrate a terminal type based on a CA technique according to various embodiments of the present disclosure.
Figure 6A:

FIG. 6A illustrates a case where a terminal A not supporting the CA technique occupies one carrier 602 in a downlink band and occupies one carrier 604 in an uplink band.

Figure 6B:
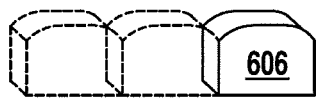
Figure 6B:

FIG. 6B illustrates a case where a terminal B not supporting the CA technique occupies one carrier 606 (e.g., a carrier not occupied by a different terminal A) in a downlink band and occupies one carrier 608 (e.g., a carrier not occupied by the different terminal A) in an uplink band.

Figure 6C:
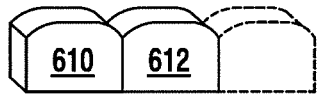
Figure 6C:
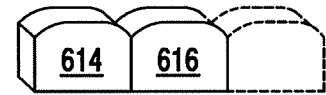

FIG. 6C illustrates a case where a terminal C supporting the CA technique occupies two carriers 610, 612 consecutively in a downlink band and occupies two carriers 614, 616 in an uplink band. A case of FIG. 6C may be defined as a symmetric CA.

Figure 6D:
Figure 6D:

FIG. 6D illustrates a case where a terminal D supporting the CA technique occupies two carriers 618, 620 consecutively by connecting the carriers in a downlink band and occupies one carrier 622 in an uplink band. A case of FIG. 6D may be defined as an asymmetric CA.

Figure 7A:
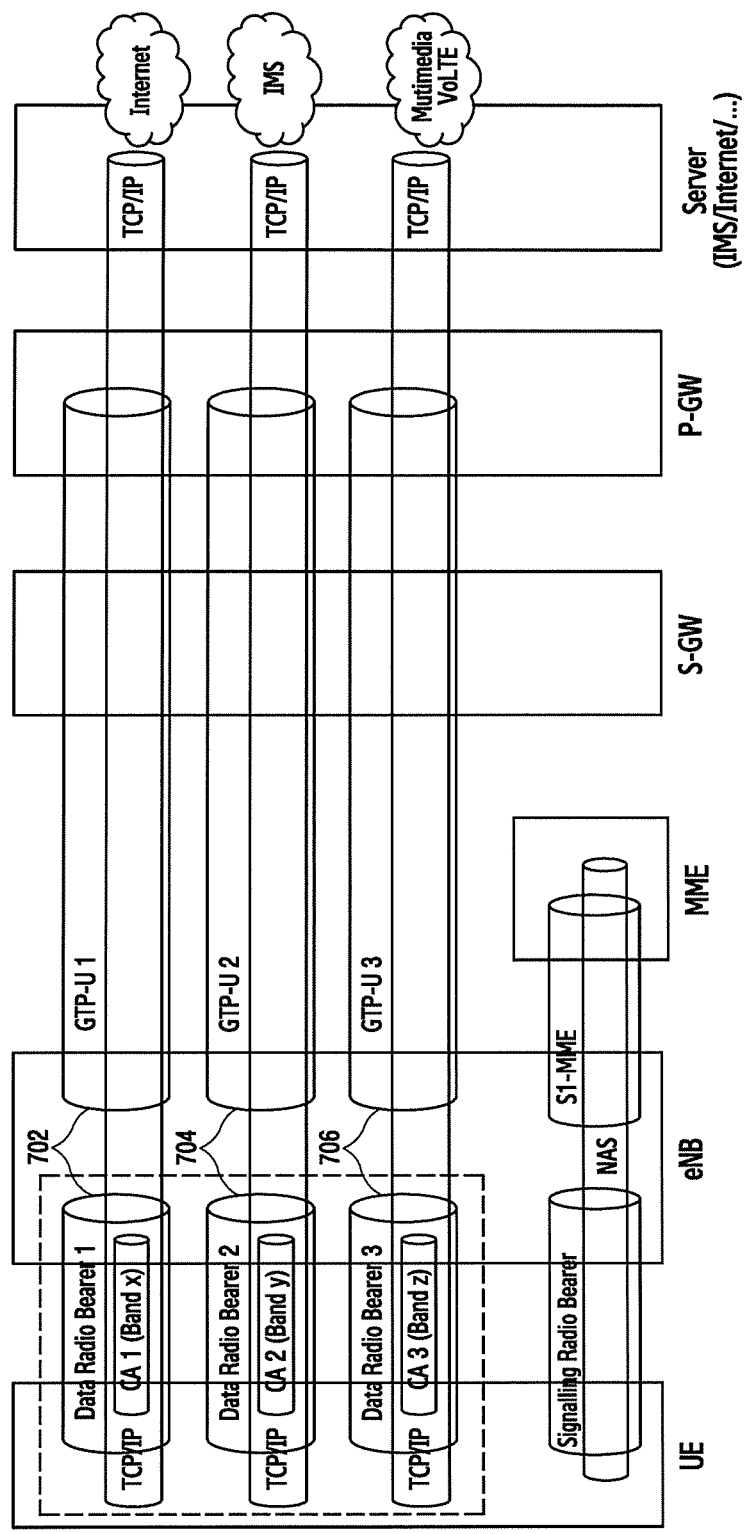
FIG. 7A to FIG. 7C illustrate a scenario for connecting multiple Packet Data Networks (PDNs) based on dynamic CA in an LTE system connected through tunneling between a User Equipment (UE) and a PDN-GateWay (P-GW) according to various embodiments of the present disclosure.
Figure 7B:
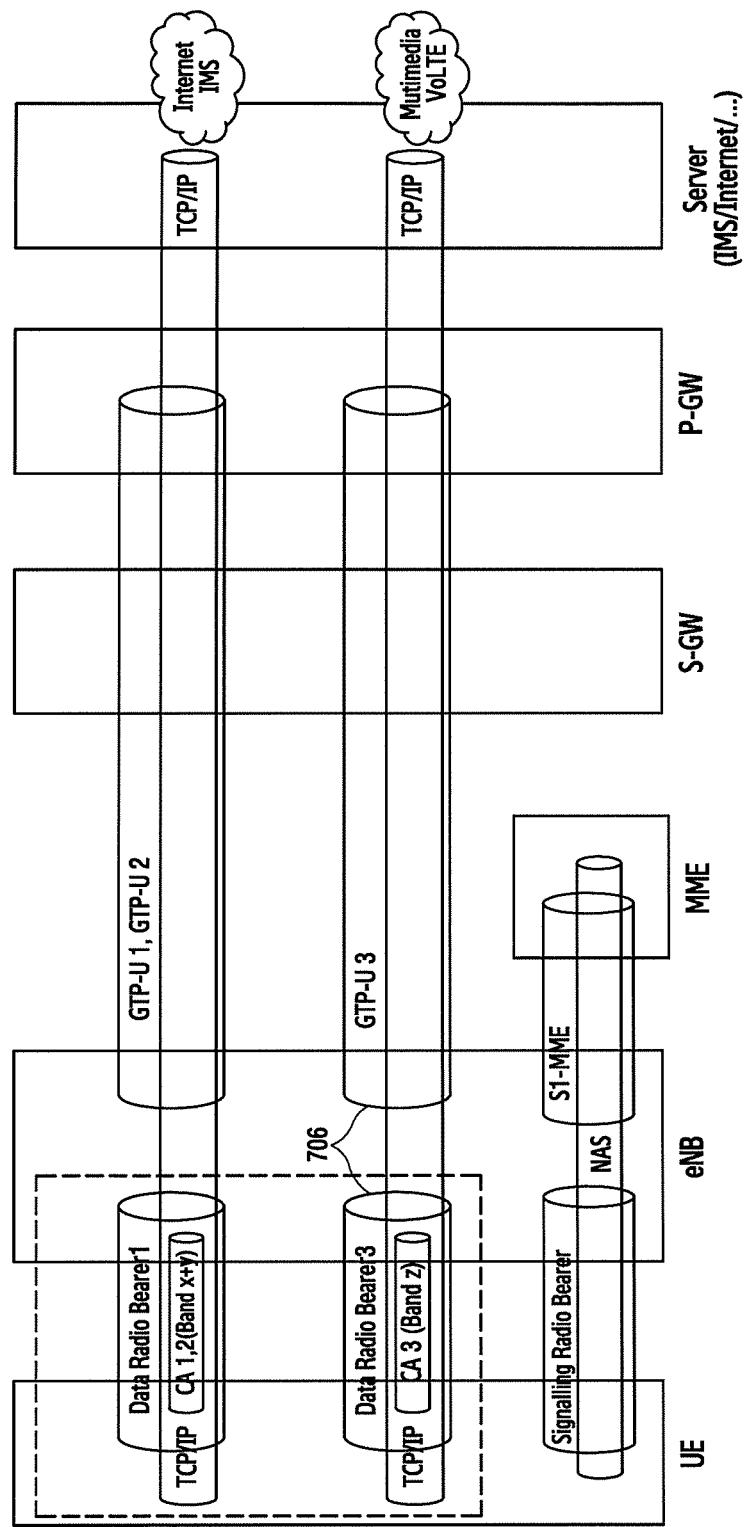
Figure 7C:
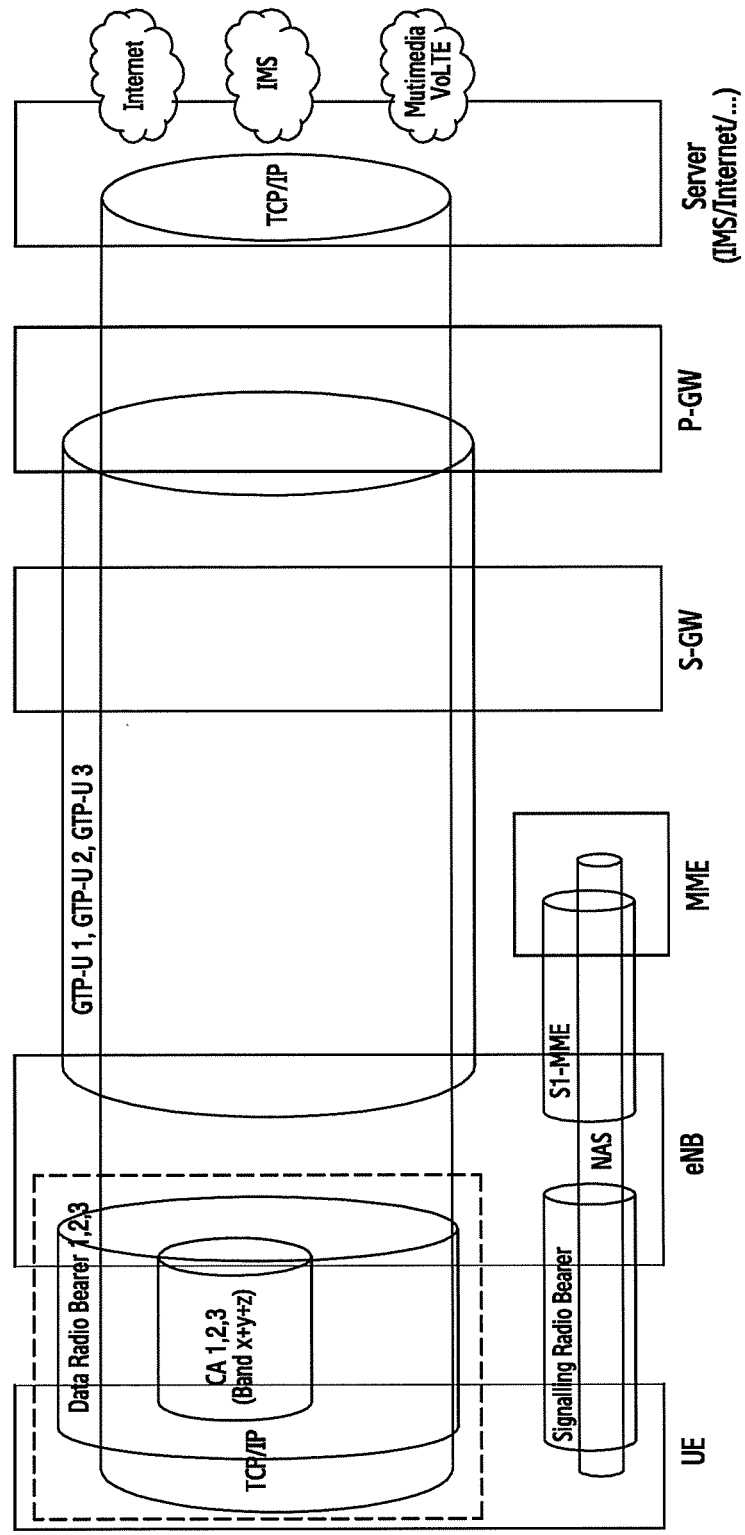

FIG. 7A to FIG. 7C illustrate a scenario for connecting multiple PDNs based on a dynamic CA in an LTE system connected through tunneling between a UE and a P-GW according to various embodiments of the present disclosure. According to various embodiments, a connection may be established between an eNB and the P-GW through GTP tunneling, and a connection may be established between the UE and the eNB through a Data Radio Bearer (DRB). A bearer between the UE and the P-GW is called an EPS bearer. A PDN connection established when the UE is connected to the PDN is called an EPS session. The EPS session has one or more EPS bearers, and may be applied with a QoS policy from a PCRF and may apply this to the EPS bearer. Further, the EPS session may deliver a signaling signal through an NAS between the UE and an MME.

Referring to FIG. 7A, a PDN related to the Internet may be connected by using a band x for creating a first EPS bearer 702 between the UE and the P-GW, a PDN related to an IMS may be connected by using a band y for creating a second EPS bearer 704 between the UE and the P-GW, and a PDN related to VoLTE may be connected by using a band z for creating a third EPS bearer 706 between the UE and the P-GW.

Referring to FIG. 7B, a PDN related to the Internet and a PDN related to an IMS may be connected by using a band x+y for creating first and second EPS bears between a UE and a P-GW, and a PDN related to VoLTE may be connected by using a band z for creating a third EPS bearer 706 between the UE and the P-GW.

Referring to FIG. 7C, a PDN related to the Internet, a PDN related to an IMS, and a PDN related to VoLTE may be connected by using a band x+y+z for creating first, second, and third EPS bearers between a UE and a P-GW.

Figures 8A, 8B, 8C:
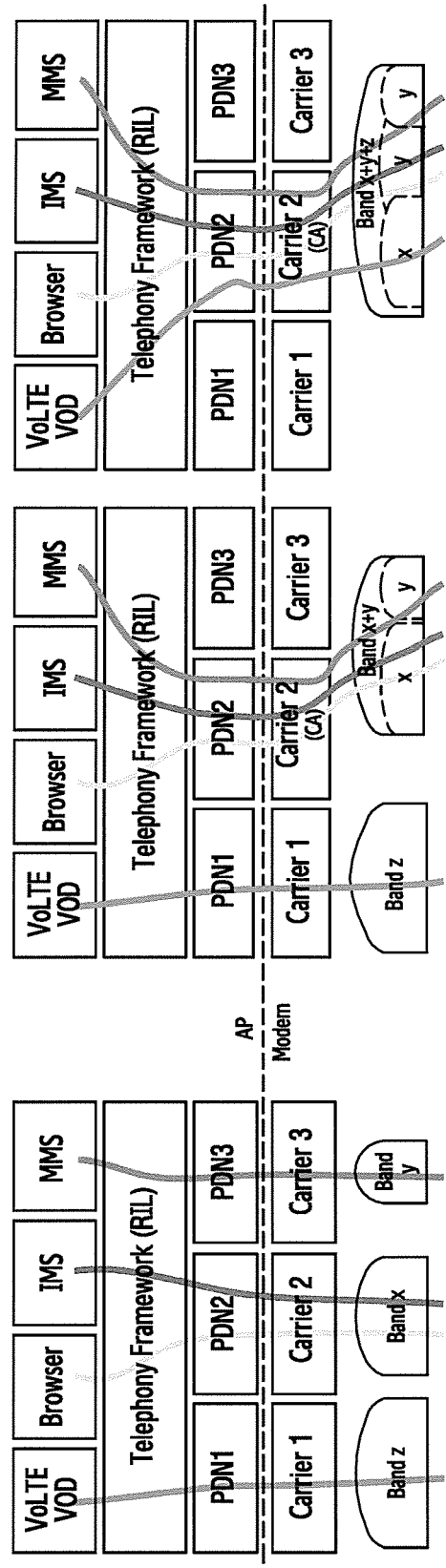
FIG. 8A to FIG. 8C illustrate a scenario for connecting multiple PDNs based on a dynamic CA between a modem level and an application level according to various embodiments of the present disclosure.

FIG. 8A to FIG. 8C illustrate a scenario for connecting multiple PDNs based on a dynamic CA between a modem level and an application level according to various embodiments of the present disclosure. For example, VoLTE, browser, IMS, and MMS services of the application level may be provided through first to third PDNs, and three carriers (i.e., first to third carriers) may be variously combined according to the dynamic CA.

Referring to FIG. 8A, a wireless communication system may connect a second PDN related to browser and IMS services by using a band x corresponding to a second carrier, may connect a third PDN related to an MMS service by using a band y corresponding to a third carrier, and may connect a first PDN related to VoLTE VOD by using a band z corresponding to a first carrier.

Referring to FIG. 8B, a wireless communication system may connect second and third PDNs related to browser, IMS, and MMS services by using a band x+y in which second and third carriers are combined through the CA, and may connect a first PDN related to VoLTE VOD by using a band z corresponding to a first carrier.

Referring to FIG. 8C, a wireless communication system may connect first, second, and third PDNs related to browser, IMS, MMS, and VoLTE VOD services by using a band x+y+z in which first, second, and third carriers are combined through the CA.

According to a network operation policy, the wireless communication system may use each band to operate three PDNs as shown in FIG. 8A, or may aggregate two bands into one PDN to operate two PDNs in total as shown in FIG. 8B, or may aggregate three bands into one PDN to operate one PDN as shown in FIG. 8C.

For example, the wireless communication system may create a Data Radio Bearer (DRB) and allocate a per-carrier IP (or PDN) address separately, by considering an operator BandWidth (BW) or a UE context (e.g., user configurations, a battery state, a power consumption).

That is, the wireless communication system may combine carriers according to a user subscription fee or a UE's current consumption state (e.g., battery capacity, user configurations, etc.), an application type (or traffic type) to be used by a user.

Since the per-carrier IP (or PDN) address is allocated separately or a PDN is operated by combining carriers according to a traffic type, the wireless communication system may physically ensure per-user QoS in various manners. For example, even if users use the same service, the wireless communication system may differentiate service quality by combining the CA according to a user fee, or may ensure service quality by combining the CA according to an application type.

An electronic device according to various embodiments of the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player(PMP), a MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, a smart watch).

According to certain embodiments, the electronic device may be a smart home appliance having a communication function. For example, the smart home appliance may include at least one of a TeleVision (TV), a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to certain embodiments, the electronic device may include at least one of various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, and Point Of Sales (POS) of shops.

According to certain embodiments, the electronic device may include at least one of a furniture or a part of building/constructions including a communication function, an electronic board, an electronic signature receiving device, a projector, and various measurement machines (e.g., water supply, electricity, gas, propagation measurement machine, and the like). The electronic device according to various embodiment of the present disclosure may be one or more combinations of the aforementioned various devices. In addition, the electronic device according to various embodiments of the present disclosure may be a flexible device. It is apparent those ordinarily skilled in the art that the electronic device according to various embodiments of the present disclosure is not limited to the aforementioned devices.

Hereinafter, an electronic device according to various embodiments will be described with reference to the accompanying drawings. The term 'user' used in the various embodiments may refer to a person who uses the electronic device or a device (e.g., an Artificial Intelligence (AI) electronic device) which uses the electronic device.

Figure 9:
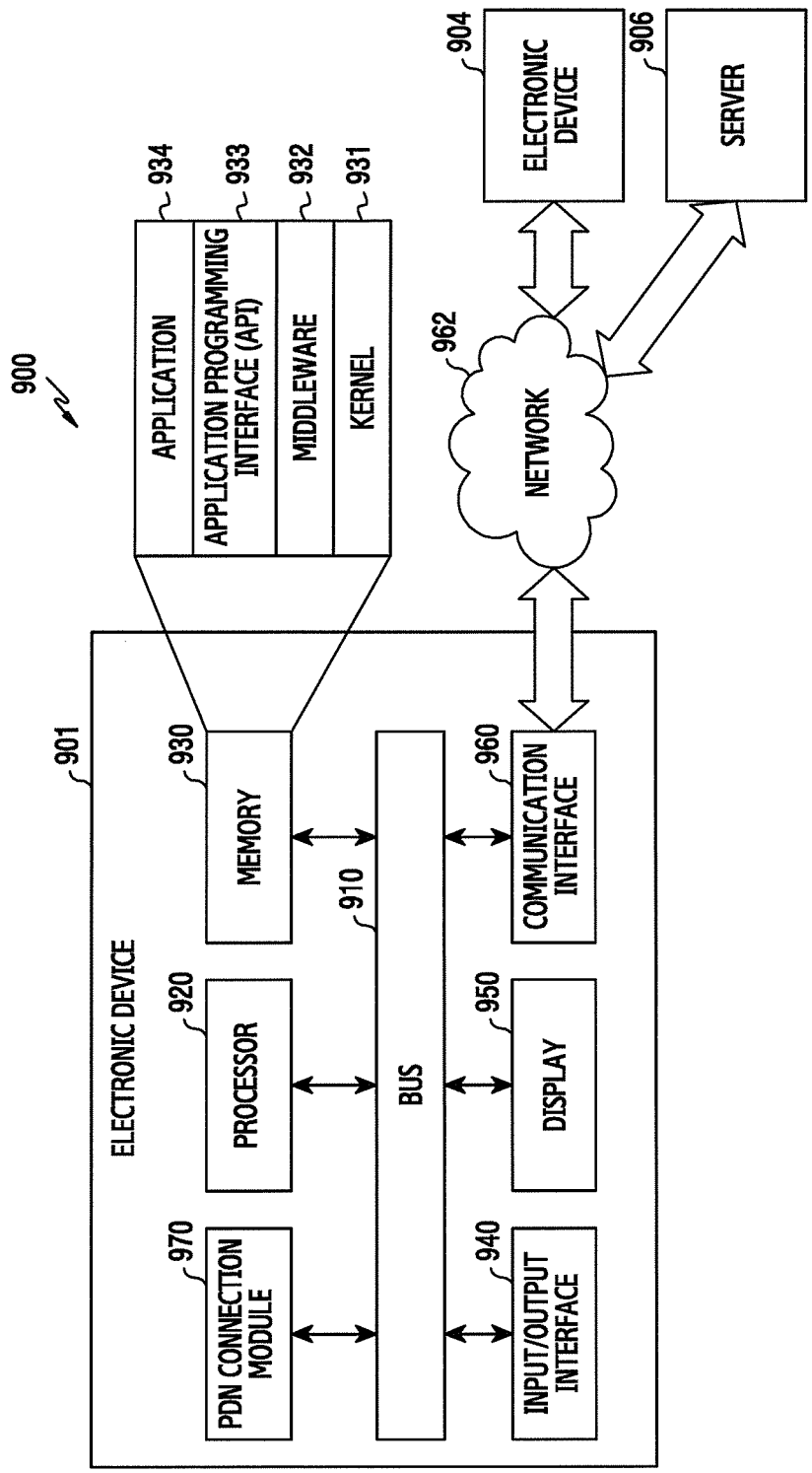
FIG. 9 illustrates a network environment including an electronic device according to various embodiments of the present disclosure.

FIG. 9 illustrates a network environment 900 including an electronic device 901 according to various embodiments. Referring to FIG. 9, the electronic device 901 may include a bus 910, a processor 920, a memory 930, an input/output interface 940, a display 950, a communication interface 960, and a PDN connection module 970.

The bus 910 may be a circuit interconnecting the aforementioned components and transmitting communication (e.g., a control message) between the aforementioned components.

The processor 920, for example, may receive instructions from the aforementioned components (e.g., the memory 930, the input/output interface 940, the display 950, the communication interface 960, and the PDN connection module 970) other than the processor 920 through the bus 910, decode the received instructions, and perform operations or data processing according to the decoded instructions.

The memory 930 may store instructions or data received from or generated by the processor 920 or other components (e.g., the input/output interface 940, the display 950, the communication interface 960, and the PDN connection module 970). The memory 930 may include programming modules, for example, a kernel 931, middleware 932, an application programming interface (API) 933, and applications 934. Each of the programming modules as described above may be formed by software, firmware, hardware, or a combination of two or more thereof.

The kernel 931 may control or manage system resources (e.g., the bus 910, the processor 920, and the memory 930) used to execute operations or functions implemented in the remaining other programming modules, for example, the middleware 932, the API 933, and the applications 934. Further, the kernel 931 may provide an interface that allows the middleware 932, the API 933, or the applications 934 to access and control or manage individual components of the electronic device 901.

The middleware 932 may serve to mediate between the API 933 or the applications 934 and the kernel 931, that is, allow the API 933 or the application 934 to communicate and exchange data with the kernel 931. Further, the middleware 932 may perform control (e.g., scheduling or load balancing) for task requests received from the applications 934 by using, for example, a method of assigning a priority for use of the system resource (e.g., the bus 910, the processor 920, or the memory 930) of the electronic device 101 to at least one of the applications 934.

The API 933 is an interface for allowing the applications 934 to control functions provided by the kernel 931 and the middleware 932, and may include at least one interface or function (e.g., instruction) for, for example, file control, window control, image processing, or text control.

According to various embodiments, the applications 934 may include an SMS/MMS application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 934 may include an application associated with information exchange between the electronic device 901 and an external electronic device (e.g., the electronic device 904). The application associated with information exchange, for example, may include a notification relay application for transferring specific information to the external electronic device or a device management application for managing the external electronic device.

For example, the notification relay application may include a function of transferring notification information, generated in another application of the electronic device 901 (e.g., the SMS/MMS application, the e-mail application, the health care application, or the environmental information application), to an external electronic device (e.g., the electronic device 904). Additionally or alternatively, the notification relay application, for example, may receive notification information from an external electronic device (e.g., the electronic device 904) and provide the received notification information to a user. The device management application, for example, may manage (e.g., install, remove, or update) a function for at least a part of an external electronic device (e.g., the electronic device 904) communicating with the electronic device 901 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments, the applications 934 may include an application specified according to the attribute (e.g., type) of an external electronic device (e.g., the electronic device 904). For example, when the external electronic device is an MP3 player, the applications 934 may include an application associated with music playback. Similarly, when the external electronic device is a mobile medical device, the applications 934 may include an application associated with health care. According to an embodiment, the applications 934 may include at least one of an application assigned to the electronic device 901 and an application received from an external electronic device (e.g., the server 906 or the electronic device 904).

The input/output interface 940, for example, may transfer instructions or data, input from a user through an input/output device (e.g., a sensor, a keyboard, or a touch screen), to the processor 920, the memory 930, the communication interface 960, or the PDN connection module 970 through the bus 910. For example, the input/output interface 940 may provide the processor 920 with data corresponding to a user's touch input through a touch screen. Further, the input/output interface 940 may, for example, receive instructions or data from the processor 920, the memory 930, the communication interface 960, or the PDN connection module 970 through the bus 910 and output the received instructions or data through the input/output device (e.g., a speaker or a display). For example, the input/output interface 940 may output voice data processed by the processor 920 to a user through a speaker.

The display 950 may display various pieces of information (e.g., multimedia data or text data) to a user.

The communication interface 960 may establish communication between the electronic device 901 and an external electronic device (e.g., the electronic device 904 or the server 906). For example, the communication interface 960 may be connected to the network 962 through wireless or wired communication and thereby communicate with the external device. The wireless communication, for example, may include at least one of wireless fidelity (WiFi), Bluetooth (BT), near field communication (NFC), a global positioning system (GPS), and cellular communication (e.g., LTE, LTE-A, CDMA, CDMA, UMTS, WiBro, or GSM). The wired communication, for example, may include at least one of a universal serial bus (USB), a high definition multimedia interface (HDMI), recommended standard 232 (RS-232), and a plain old telephone service (POTS).

According to an embodiment, the network 962 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 901 and an external device may be supported by at least one of the applications 934, the application programming interface 933, the middleware 932, the kernel 931, and the communication interface 960.

The PDN connection module 970 may handle at least one part of information required from different constitutional elements (e.g., the processor 920, the memory 930, the input/output interface 940, the communication interface 960, or the like), and may provide this to a user in various manners. For example, the PDN connection module 970 may control at least some functions of the electronic device 910 independently or by using the processor 920 so that the electronic device 901 interworks with another electronic device (e.g., the electronic device 904 or the server 906). Additional information regarding the PDN connection module 970 is provided by using FIG. 10 and FIG. 11 described below.

Figure 10:
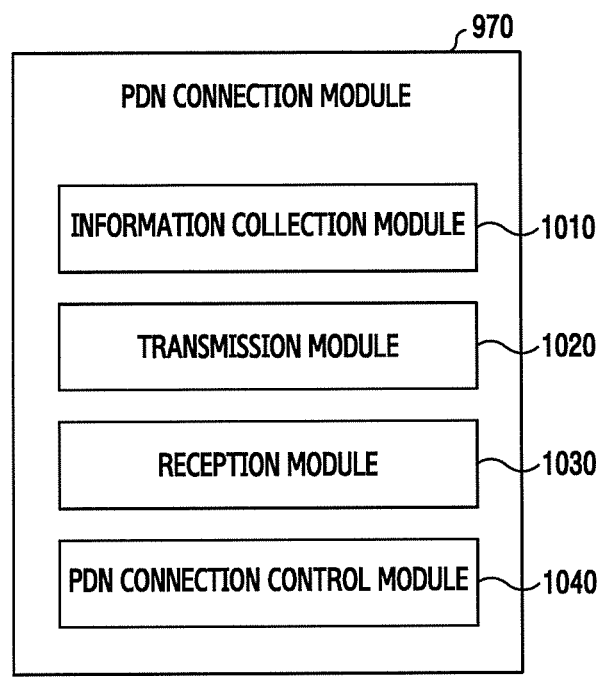
FIG. 10 illustrates a PDN connection module of the electronic device of FIG. 9.

FIG. 10 illustrates the PDN connection module 970 of an electronic device (e.g., the electronic device 901) according to various embodiments. Referring to FIG. 10, according to various embodiments, the PDN connection module 970 may include an information collection module 1010, a transmission module 1020, a reception module 1030, and a PDN connection control module 1040.

The information collection module 1010 may collect user state information, such as user configurations, a battery state, or a power consumption, for determining an operation policy of multiple PDNs based on a dynamic CA carrier.

The transmission module 1020 may transmit the user state information or information regarding the dynamic CA carrier to a core network. The information regarding the dynamic CA carrier may imply information regarding how to combine and use multiple bandwidths. For example, the information regarding the dynamic CA carrier may imply information regarding whether bands x, y, and z will operate with one band (e.g., x+y+z) or with two bands (e.g., x+y, z) or with other two bands (e.g., x, y+z) or with three bands (e.g., x, y, z) according to the CA.

The reception module 1030 may receive information regarding the operation policy of the multiple PDNs based on the dynamic CA carrier from the core network. For example, the information regarding the operation policy of the multiple PDNs may be information in which a PDN1 corresponding to VoLTE, VoD services is mapped to the band z, a PDN2 corresponding to browser, IMS services is mapped to the band y, and a PDN 3 corresponding to an MMS service is mapped to the band z.

The PDN connection control module 1040 may create a data bearer by using the information regarding the operation policy of the multiple PDNs based on the dynamic CA carrier.

As described above, when the electronic device transmits the user state information or the information regarding the dynamic CA carrier to the core network, the core network may determine the information regarding the operation policy of the multiple PDNs based on the CA carrier by using the user state information and user's QoS profile information (e.g., QoS, latency, jitter, subscription fee, etc.).

According to various embodiments, the electronic device may receive necessary information (e.g., user's QoS profile information (e.g., QoS, latency, jitter, subscription fee, etc.)) from the core network, and may determine the information regarding the operation policy of the multiple PDNs based on the dynamic CA carrier.

A method of an electronic device for connecting to multiple PDNs in a wireless communication system using a CA technique may include transmitting information regarding a CA carrier and information regarding a first operation policy of multiple PDNs based on the CA carrier to a core network, receiving information regarding an a second operation policy of multiple PDNs based on the CA carrier from the core network, and configuring a radio bearer for data communication according to the received operation policy of the second multiple PDNs based on the CA carrier. The information regarding the operation policy of the first multiple PDNs based on the CA carrier may be dependent on at least one of a user configuration, a battery state, and a power consumption. The information regarding the operation policy of the second multiple PDNs based on the CA carrier may be dependent on at least one of a frequency, a bandwidth, user's service quality, a user's subscription fee, a latency, and a jitter. The operation policy of the PDN may include mapping information between at least one carrier and at least one PDN. The method may further include updating the operation policy of the second multiple PDNs on a real-time basis according to a network environment. A path of a radio bearer for the data communication may be created among the electronic device, an eNB, an S-GW, and a P-GW.

Figure 11:
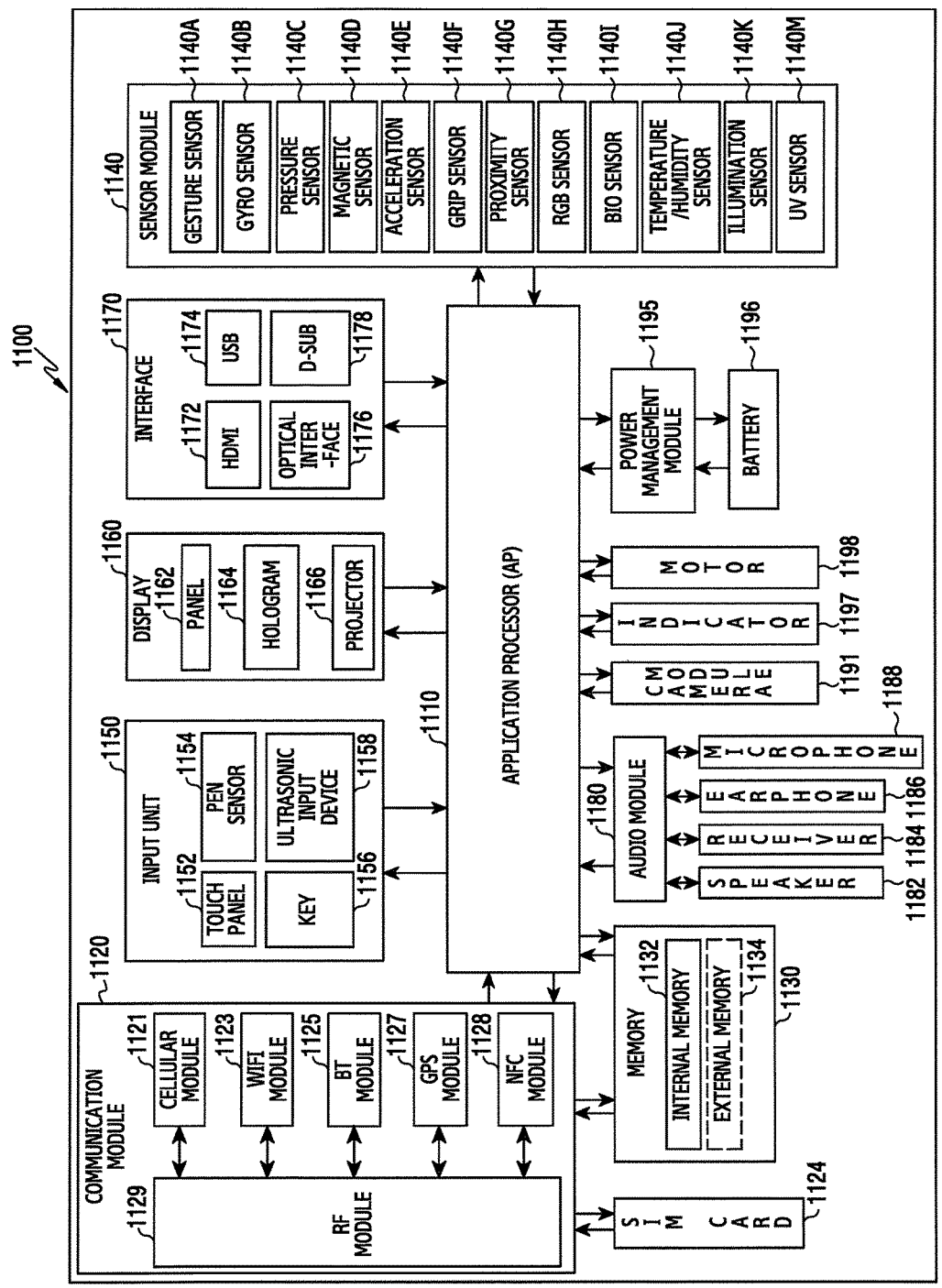
FIG. 11 illustrates a block diagram of an electronic device according to various embodiments of the present disclosure.

FIG. 11 illustrates a block diagram of an electronic device according to various embodiments. The electronic device 1100, for example, may constitute all or a part of the electronic device 901 shown in FIG. 9. Referring to FIG. 11, the electronic device 1100 may include at least one application processor (AP) 1110, a communication module 1120, at least one subscriber identity module (SIM) card slots 1124, a memory 1130, a sensor module 1140, an input module 1150, a display 1160, an interface 1170, an audio module 1180, a camera module 1191, a power management module 1195, a battery 1196, an indicator 1197, and a motor 1198.

The AP 1110 may drive an operating system or an application program to control a plurality of hardware or software components connected to the AP 1110, and may perform processing and operations of various data including multimedia data. The AP 1110, for example, may be implemented as a system on chip (SoC). According to an embodiment, the AP 1110 may further include a graphic processing unit (GPU) (not shown).

The communication module 1120 (e.g., the communication interface 160) may perform data transmission/reception in communication with other electronic devices (e.g., the electronic device 104 and the server 106) connected to the electronic device 1100 (e.g., the electronic device 101) through a network. According to an embodiment, the communication module 1120 may include a cellular module 1121, a WiFi module 1123, a BT module 1122, a GPS module 1127, an NFC module 1128, and a radio frequency (RF) module 1129.

The cellular module 1121 may provide a voice call, a video call, an SMS service, an Internet service, and the like through a communication network (e.g., LTE, LTE-A, CDMA, WCDMA, UMTS, WiBro, or GSM). Also, the cellular module 1121 may identify and authenticate an electronic device in a communication network by using, for example, a subscriber identification module (e.g., the SIM card). According to an embodiment, the cellular module 1121 may perform at least some of the functions that may be provided by the AP 1110. For example, the cellular module 1121 may perform at least a multimedia control function.

According to an embodiment, the cellular module 1121 may include a communication processor (CP). Further, the cellular module 1121, for example, may be implemented as a SoC. Although the cellular module 1121 (e.g., a CP), the memory 1130, the power management module 1195, and the like are shown as separate elements from the AP 1110 in FIG. 11, the AP 1110 may be implemented to include at least some (e.g., the cellular module 1121) of the aforementioned elements according to an embodiment.

According to an embodiment, the AP 1110 or the cellular module 1121 (e.g., a CP) may load a command or data received from at least one of a non-volatile memory and other elements connected thereto into a volatile memory and process the loaded command or data. Further, the AP 1110 or the cellular module 1121 may store data received from or generated by at least one of other elements in a non-volatile memory.

Each of the WiFi module 1123, the BT module 1122, the GPS module 1127, and the NFC module 1128, for example, may include a processor for processing data transmitted or received through the corresponding module. Although the cellular module 1121, the WiFi module 1123, the BT module 1122, the GPS module 1127, and the NFC module 1128 are shown as separate blocks in FIG. 11, at least some (e.g., two or more) of the cellular module 1121, the WiFi module 1123, the BT module 1122, the GPS module 1127, and the NFC module 1128 may be included in one integrated chip (IC) or one IC package according to an embodiment. For example, at least some of processors corresponding to the cellular module 1121, the WiFi module 1123, the BT module 1122, the GPS module 1127, and the NFC module 1128 respectively (e.g., a CP corresponding to the cellular module 1121 and a WiFi processor corresponding to the WiFi module 1123) may be implemented as one SoC.

The RF module 1129 may perform data transmission/reception, for example, RF signal transmission/reception. Although not shown in the drawing, the RF module 1129, for example, may include a transceiver, a power amp module (PAM), a frequency filter, a low noise amplifier (LNA), and the like. Also, the RF module 1129 may further include a component for transmitting/receiving an electromagnetic wave over the air in wireless communication, such as a conductor or a conducting wire. Although FIG. 11 shows that the cellular module 1121, the WiFi module 1123, the BT module 1122, the GPS module 1127, and the NFC module 1128 share one RF module 1129, at least one of the cellular module 1121, the WiFi module 1123, the BT module 1122, the GPS module 1127, and the NFC module 1128 may perform RF signal transmission/reception through a separate RF module according to an embodiment.

The at least one SIM card 1124 may be a card including a subscriber identification module, and may be inserted into at least one slot formed in a certain position of the electronic device. The at least one SIM card 1124 may include unique identification information (e.g., integrated circuit card identifier (ICCID)) or subscriber information (e.g., international mobile subscriber identity (IMSI)).

The memory 1130 (e.g., the memory 130) may include an internal memory 1132 or an external memory 1134. The internal memory 1132, for example, may include at least one of a volatile memory (e.g., a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EE- PROM), a mask ROM, a flash ROM, a NAND flash memory, or an NOR flash memory).

According to an embodiment, the internal memory 1132 may be a solid state drive (SSD). The external memory 1134 may further include a flash drive, for example, a compact flash (CF), a secure digital (SD), a micro secure digital (Micro-SD), a mini secure digital (Mini-SD), an extreme digital (xD), or a memory stick. The external memory 1134 may be functionally connected to the electronic device 1100 through various interfaces. According to an embodiment, the electronic device 1100 may further include a storage device (or storage medium) such as a hard drive.

The sensor module 1140 may measure a physical quantity or detect an operation state of the electronic device 1100 and convert the measured or detected information into an electronic signal. The sensor module 1140, for example, may include at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., a red, green and blue (RGB) sensor), a biometric sensor 1140I, a temperature/humidity sensor 1140J, a light sensor 1140K, and a ultraviolet (UV) sensor 1140M. Additionally or alternatively, the sensor module 1140, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 1140 may further include a control circuit for controlling one or more sensors included therein.

The input module 1150 may include a touch panel 1152, a (digital) pen sensor 1154, a key 1156, or an ultrasonic input unit 1158. The touch panel 1152 that recognizes a touch input, for example, may include at least one of a capacitive touch panel, a resistive touch panel, an infrared touch panel, and an acoustic wave touch panel. Also, the touch panel 1152 may further include a control circuit. When the touch panel is a capacitive touch panel, it may recognize a physical contact or proximity. The touch panel 1152 may also further include a tactile layer. In this case, the touch panel 1152 may provide a tactile response to a user.

The (digital) pen sensor 1154, for example, may be implemented using a means identical or similar to a means for receiving a touch input from a user or using a separate recognition sheet. The key 1156, for example, may include a physical button, an optical key, or a keypad. The ultrasonic input unit 1158 is a unit that can identify data by generating an ultrasonic signal through an input tool and detecting a sonic wave through a microphone (e.g., the microphone 688) in the electronic device 600, and is capable of wireless recognition. According to an embodiment, the electronic device 1100 may also receive a user input from an external device (e.g., computer or server) connected thereto by using the communication module 1120.

The display 1160 (e.g., the display 950) may include a panel 1162, a hologram unit 1164, or a projector 1166. The panel 1162, for example, may be a liquid crystal display (LCD) or an active matrix-organic light emitting diode (AM-OLED). The panel 1162, for example, may be implemented to be flexible, transparent, or wearable. The panel 1162 may also be incorporated into one module together with the touch panel 1152. The hologram unit 1164 may show a stereoscopic image in the air by using light interference. The projector 1166 may display an image by projecting light onto a screen. The screen, for example, may be located inside or outside of the electronic device 1100. According to an embodiment, the display 1160 may further include a control circuit for controlling the panel 1162, the hologram unit 1164, or the projector 1166.

The interface 1170, for example, may include a high-definition multimedia interface (HDMI) 1172, a universal serial bus (USB) 1174, an optical interface 1176, or a D-subminiature (D-sub) 1178. The interface 1170, for example, may be included in the communication interface 960 shown in FIG. 9. Additionally or alternatively, the interface 1190, for example, may include a mobile high-definition link (MHL) interface, a secure digital (SD) card/multimedia card (MMC) interface, or an infrared data association (IrDA) interface.

The audio module 1180 may provide bidirectional conversion between a sound and an electronic signal. At least some elements of the audio module 1180, for example, may be included in the input/output interface 940 shown in FIG. 9. The audio module 1180, for example, may process sound information input or output through a speaker 1182, a receiver 1184, earphones 1186, or the microphone 1188.

The camera module 1191 is a device that can take both still and moving images, and according to an embodiment, may include one or more image sensors (e.g., a front sensor or a rear sensor, not shown), a lens (not shown), an image signal processor (ISP) (not shown), or a flash (e.g., an LED or xenon lamp, not shown).

The power management module 1195 may manage power of the electronic device 1100. Although not shown, the power management module 1195, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 1196. The battery 1196 may store or generate electricity, and may supply power to the electronic device 1100 by using the stored or generated electricity. The battery 1196, for example, may include a rechargeable battery or a solar battery.

The indicator 1197 may display a specific status of the electronic device 1100 or a part thereof (e.g., the AP 1110), for example, a boot-up status, a message status, or a charging status. The motor 1198 may convert an electrical signal into a mechanical vibration. Although not shown, the electronic device 1100 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations.

Figure 12:
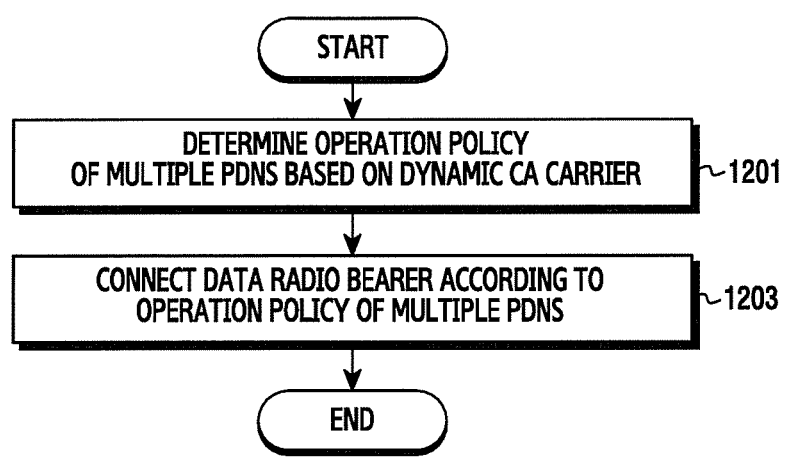
FIG. 12 illustrates a process for connecting to multiple PDNs in a wireless communication system using a CA technique according to various embodiments of the present disclosure.

FIG. 12 illustrates a process for connecting to multiple PDNs in a wireless communication system using a CA technique according to various embodiments of the present disclosure.

Referring to FIG. 12, according to various embodiments, in an operation 1201, an electronic device may determine or modify an operation policy of multiple PDNs based on a dynamic CA carrier in accordance with a UE state (e.g., user configurations, a battery, a power consumption, etc.). For example, the operation policy of the multiple PDNs based on the dynamic CA carrier may be determined or modified as shown in Table 1 or Table 2 below.

In an operation 1203, the electronic device may configure a radio bearer for data communication according to the determined operation policy of the multiple PDNs based on the dynamic CA carrier.

TABLE 1

| operation policy number | operation description | EPS bearer ID | APN | band | remark |
|---|---|---|---|---|---|
| 1 | VoLTE, VOD | 1 | PDN1 | z | |
| 2 | Browser, IMS | 2 | PDN2 | x | |
| 3 | MMS | 3 | PDN3 | y | |

It may be determined such that a PND1 corresponding to VoLTE, VOD services uses a band z, a PND2 corresponding to browser, IMS services uses a band x, and a PND3 corresponding to an MMS service uses a band y.

TABLE 2

| operation policy number | operation description | EPS bearer ID | APN | band | remark |
|---|---|---|---|---|---|
| 1 | VoLTE, VOD | 1 | PDN1 | z | |
| 2 | Browser, IMS, MMS | 2 | PDN2 | x + y | CA |

It may be determined such that a PND1 corresponding to VoLTE, VOD services uses a band z, and a PND2 corresponding to browser, IMS, MMS services uses a band x+y.

In various embodiments, the operation policy of the multiple PDNs based on the dynamic CA carrier of the electronic device may be modified on a real-time basis. For example, it may be modified from Table 1 above to Table 2 above.

Figure 13:
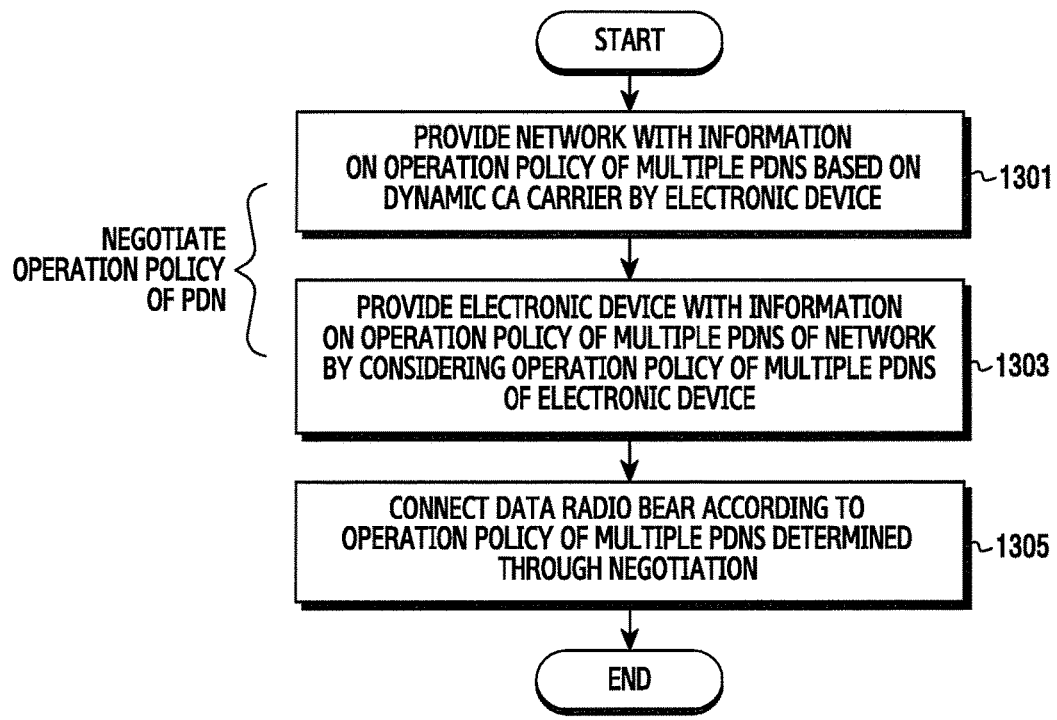
FIG. 13 illustrates a process for connecting to multiple PDNs in a wireless communication system using a CA technique according to various embodiments of the present disclosure.

FIG. 13 illustrates a process for connecting to multiple PDNs in a wireless communication system using a CA technique according to various embodiments of the present disclosure.

Referring to FIG. 13, according to various embodiments, in an operation 1301, an electronic device may determine an operation policy of multiple PDNs based on a dynamic CA carrier, and may transmit information on the determined operation policy of the multiple PDNs based on the dynamic CA carrier to a core network, in accordance with a UE state (e.g., a user configuration, a battery, a power consumption, etc.). For example, the electronic device may determine the operation policy of the multiple PDNs based on the dynamic CA carrier as shown in <Table 1> or <Table 2> above, and may transmit the determined operation policy to the core network.

In an operation 1303, the core network may determine whether the electronic device can accept the aforementioned operation policy of the multiple PDNs based on the dynamic CA carrier, and may transmit information regarding an operation policy of multiple PDNs based on a final dynamic CA carrier to be used by the electronic device to the electronic device.

For example, the core network may determine the operation policy of the PDNs based on the dynamic CA carrier according to a network state and function (i.e., a frequency, a bandwidth, a user's subscription fee).

In an operation 1305, the electronic device and the core network may configure a radio bearer for data communication according to the operation policy of the multiple PDNs based on the final dynamic CA carrier.

A method of an electronic device for connecting to multiple PDNs in a wireless communication system using a CA technique may include transmitting information regarding a CA carrier and information regarding a first operation policy of multiple PDNs based on the CA carrier to a core network, receiving information regarding a second operation policy of multiple PDNs based on the CA carrier from the core network, and configuring a radio bearer for data communication according to the received operation policy of the second multiple PDNs based on the CA carrier.

The information regarding the operation policy of the first multiple PDNs based on the CA carrier may be determined by using at least one of a user configuration, a battery state, and a power consumption.

The information regarding the operation policy of the second multiple PDNs based on the CA carrier may be determined by using at least one of a frequency, a bandwidth, user's service quality, a user's subscription fee, a latency, and a jitter.

The operation policy of the PDN may include mapping information between at least one carrier and at least one PDN.

The operation policy of the second multiple PDNs may be updated on a real-time basis according to a network environment.

A path of a radio bearer for the data communication may be created among the electronic device, an eNB, an S-GW, and a P-GW.

The wireless communication system may be an LTE system.

A method of a core network for connecting to multiple PDNs in a wireless communication system using a CA technique may include receiving information regarding a CA carrier and information regarding a first operation policy of multiple PDNs based on the CA carrier from an electronic device, determining whether to accept the first operation policy of multiple PDNs based on the CA carrier, transmitting information regarding a second operation policy of multiple PDNs based on the CA carrier to the electronic device according to a result of the determination, and configuring a radio bearer for data communication according to the received operation policy of the second multiple PDNs based on the CA carrier.

The information regarding the operation policy of the first multiple PDNs based on the CA carrier may be determined by using at least one of a user configuration, a battery state, and a power consumption.

The information regarding the operation policy of the second multiple PDNs based on the CA carrier may be determined by using at least one of a frequency, a bandwidth, user's service quality, a user's subscription fee, a latency, and a jitter.

The operation policy of the PDN may include mapping information between at least one carrier and at least one PDN.

The method may further include updating the operation policy of the second multiple PDNs on a real-time basis according to a network environment.

A path of a radio bearer for the data communication may be created among the electronic device, an eNB, an S-GW, and a P-GW.

The wireless communication system may be an LTE system.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations.

At least some of the devices (e.g., modules or functions thereof) or methods (e.g., operations) according to various embodiments of the present disclosure, for example, may be implemented by an instruction stored in a computer-readable storage medium in the form of a programming module. The instruction, when executed by at least one processor (e.g., the processor 920), enables the at least one processor to perform a function corresponding to the instruction. The computer-readable storage medium, for example, may be the memory 930. At least a part of the programming module, for example, may be implemented (e.g., executed) by the processor 920. At least a part of the programming module, for example, may include a module, a program, a routine, a set of instructions, or a process for performing at least one function.

The computer-readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute a program instruction (e.g., programming module), such as a read only memory (ROM), a random access memory (RAM), and a flash memory. Further, the program instruction may include high class language codes that can be executed in a computer by using an interpreter, as well as machine language codes that are made by a compiler. Any of the hardware devices as described above may be configured to work as one or more software modules in order to perform the operations according to various embodiments of the present disclosure, and vice versa.

Any of the modules or programming modules according to the present disclosure may include at least one of the above described elements, exclude some of the elements, or further include other additional elements. The operations performed by the modules, programming modules, or other elements according to the present disclosure may be executed in a sequential, parallel, repetitive, or heuristic manner. Further, some of the operations may be executed in a different order, some of the operations may be omitted, or other operations may be added.

According to various embodiments, in a storage medium for storing instructions, when the instructions are executed by at least one processor, the at least one processor is allowed to perform at least one operation. In a method of an electronic device for connecting to multiple PDNs in a wireless communication system using a CA technique, the at least one operation may include transmitting information regarding a CA carrier for aggregating multiple carriers into one carrier and information regarding a first operation policy of multiple PDNs based on the CA carrier to a core network, receiving information regarding a second operation policy of multiple PDNs based on the CA carrier from the core network, and configuring a radio bearer for data communication according to the received operation policy of the second multiple PDNs based on the CA carrier.

According to various embodiments, since multiple Packet Data Networks (PDNs) are dynamically connected by considering various frequency bands based on a Carrier Aggregation (CA) support, an electronic device can physically ensure Quality of Service (QoS) regarding a radio section between a User Equipment (UE) and an evolved Node B (eNB) on the basis of an operation policy. In addition, the electronic device may configure a Data Radio Bearer (DRB) according to a bandwidth used by each operator, and may separately provide a per-carrier PDN. Further, since a CA having a great bandwidth is allocated for each user according to a user subscription fee, the electronic device may physically manage user QoS.

The embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. A method of an electronic device for connecting to multiple Packet Data Networks (PDNs) in a wireless communication system using a Carrier Aggregation (CA) technique, the method comprising:
    transmitting, to a core network, information regarding one or more frequency bands and information regarding a first operation policy of the multiple PDNs that is determined based on a state of the electronic device, wherein the information regarding the first operation policy of the multiple PDNs comprises mapping information between at least one frequency band among the one or more frequency bands and at least one PDN among the multiple PDNs;
    receiving, from the core network, information regarding a second operation policy of the multiple PDNs that is determined by the core network based on the first operation policy of the multiple PDNs according to a state of the core network; and
    configuring a radio bearer for data communication according to the information regarding the second operation policy of the multiple PDNs.

2. The method of claim 1, wherein the state of the electronic device comprises at least one of a user configuration, a battery state, or a power consumption.

3. The method of claim 1, wherein the state of the electronic device comprises at least one of a frequency, a bandwidth, user's service quality, a user's subscription fee, a latency, or a jitter.

4. The method of claim 1, wherein the second operation policy of the multiple PDNs is updated on a real-time basis according to a network environment.

5. The method of claim 1, wherein a path of the radio bearer is created among the electronic device, an evolved Node B (eNB), a Serving-GateWay (S-GW), and a PDN-GateWay (P-GW).

6. The method of claim 1, wherein the wireless communication system is a Long Term Evolution (LTE) system.

7. A method of a core network for connecting to multiple Packet Data Networks (PDNs) in a wireless communication system using a Carrier Aggregation (CA) technique, the method comprising:
    receiving, from an electronic device, information regarding one or more frequency bands and information regarding a first operation policy of the multiple PDNs that is determined based on a state of the electronic device, wherein the information regarding the first operation policy of the multiple PDNs comprises mapping information between at least one frequency band among the frequency bands and at least one PDN among the multiple PDNs;
    determining whether to accept the first operation policy of the multiple PDNs based on a state of the core network;
    according to a result of the determination, transmitting, to the electronic device, information regarding a second operation policy of the multiple PDNs that is determined based on the first operation policy of the multiple PDNs according to the state of the core network; and
    configuring a radio bearer for data communication according to the second operation policy of the multiple PDNs.

8. The method of claim 7, wherein the state of the electronic device comprises at least one of a user configuration, a battery state, or a power consumption.

9. The method of claim 7, wherein the state of the core network comprises at least one of a frequency, a bandwidth, user's service quality, a user's subscription fee, a latency, or a jitter.

10. The method of claim 7, further comprising updating the second operation policy of the multiple PDNs on a real-time basis according to a network environment.

11. The method of claim 7, wherein a path of the radio bearer is created among the electronic device, an evolved Node B (eNB), a Serving-GateWay (S-GW), and a PDN GateWay (P-GW).

12. The method of claim 7, wherein the wireless communication system is a Long Term Evolution (LTE) system.

13. An electronic device for connecting to multiple Packet Data Networks (PDNs) in a wireless communication system using a Carrier Aggregation (CA) technique, the electronic device comprising:
    a transmitter configured to transmit, to a core network, information regarding one or more frequency bands and information regarding a first operation policy of the multiple PDNs that is determined based on a state of the electronic device, wherein the information regarding the first operation policy of the multiple PDNs comprises mapping information between at least one frequency band among the frequency bands and at least one PDN among the multiple PDNs;
    a receiver configured to receive, from the core network, information regarding a second operation policy of the multiple PDNs that is determined based on the first operation policy of the multiple PDNs according to the state of the core network; and
    a processor configured to configure a radio bearer for data communication according to the information regarding the second operation policy of the multiple PDNs.

14. The electronic device of claim 13, wherein the state of the electronic device comprises at least one of a user configuration, a battery state, or a power consumption.

15. The electronic device of claim 13, wherein the state of the core network comprises at least one of a frequency, a bandwidth, user's service quality, a user's subscription fee, a latency, or a jitter.

16. The electronic device of claim 13, wherein a path of the radio bearer is created among the electronic device, an evolved Node B (eNB), a Serving-GateWay (S-GW), and a PDN GW (P-GW).

17. The electronic device of claim 13, wherein the wireless communication system is a Long Term Evolution (LTE) system.

* * * * *